Patented July 12, 1949

2,476,259

UNITED STATES PATENT OFFICE 2,476,259

DISAZO DYE FROM DIHYDROXY BENZIDINE AND PROCESS THEREFOR

Hans Mayer, Basel, and Willy Widmer, Bottmingen, Switzerland, assignors to Ciba Limited, Basel, Switzerland, a Swiss firm No Drawing. Application February 28, 1947, Serial No. 731,722. In Switzerland March 8, 1946

2 Claims. (Cl. 260—183)

According to this invention valuable asymmetrical disazo-dyestuffs are made by coupling tetrazotised 3:3'-dihydroxy-4:4'-diaminodiphenyl with coupling components, and conducting the first coupling operation in a reaction medium having a pH value ranging from that of an acetic acid medium to that of a medium rendered alkaline with an alkali carbonate and the second coupling operation in a reaction medium having a pH value higher than that of the medium used in the first coupling operation.

The first coupling operation may be conducted, depending on the choice of the first coupling component, for example in a weakly acid or neutral medium or in a medium rendered alkaline with an alkali bicarbonate or alkali carbonate. The second coupling operation is conducted, for example, in a neutral medium or a medium rendered alkaline with an alkali bicarbonate or ammonia or a caustic alkali, provided that the medium is more strongly alkaline than that used in the first coupling operation. Thus, for example, the first coupling operation may be conducted in an acetic acid medium and the second coupling operation in a medium rendered alkaline with an alkali carbonate, or the first coupling operation in a medium rendered alkaline with an alkali carbonate and the second in a medium rendered alkaline with caustic alkali.

In the process of the invention there come into consideration as first and second coupling components those which owe their capacity for coupling to a reactive aromatic atomic grouping or to a reactive keto-methylene group. The coupling components may contain groups imparting solubility, such as carboxyl, sulfonamide or sulfonic acid groups. There come principally into consideration, for the first and also for the second coupling operation, components which lead to dyestuffs capable of forming heavy metal complexes, and among such components especially those which contain in ortho-position to the coupling position a group for example, a hydroxyl group, capable of forming heavy metal complexes in conjunction with the hydroxyl group of the diazocomponent. Especially valuable products may be obtained by using as the first coupling component one which contains a group imparting solubility, for example, a sulfonic acid group, and as the second coupling component, on the other hand, one which is free from groups imparting solubility such as carboxyl and sulfonic acid groups. In this connection there are suitable, for example, the following coupling components: As first coupling components: 1-(sulfoaryl)-3-methyl-5-pyrazolones, such as 1-(3'-sulfophenyl)- or 1-(4'-sulfophenyl)-3-methyl-5-pyrazolone, 1-(8'-sulfo-2'-naphthyl)-3-methyl-5-pyrazolone; 1-(carboxyphenyl)-3-methyl-5-pyrazolone, for example, 1-(4'-chloro-3'-carboxyphenyl)-3-methyl-5-pyrazolone; 1:3-diphenyl-5-pyrazolone; such as 1-(3'-sulfo-5'-chlorophenyl)-3-(4''-chlorophenyl)-5-pyrazolone; hydroxynaphthalene sulfonic acids capable of coupling in ortho-position with respect to the hydroxyl group, such as 1:3-, 1:4-, 1:5-, 2:6- or 2:7-hydroxynaphthalene sulfonic acid; and amino-hydroxynaphthalene sulfonic acids capable of coupling in ortho-position with respect to the hydroxyl group, such as 2-amino-5-hydroxynaphthalene-7-sulfonic acid, 2-amino-8-hydroxynaphthalene-6-sulfonic acid and substitution products thereof. As second coupling components: Acetoacetic acid arylides such as acetoacetic acid anilide; pyrazolone compounds such as 3-methyl-5-pyrazolone, 1-phenyl-3-methyl-5-pyrazolone and 1-(3'-nitrophenyl)-3-(4''-chlorophenyl)-5-pyrazolone; hydroxynaphthalenes capable of coupling in ortho-position with respect to a hydroxyl group such as 2-hydroxynaphthalene, 2:6-dihydroxynaphthalene, 2-hydroxy-6-methoxynaphthalene 2-amino-7-hydroxynaphthalene, 2-(β-hydroxyethylamino)-7-hydroxynaphthalene, 5:8-dichloro-1-hydroxynaphthalene and the like.

The process of the invention may lead to especially valuable results when there is chosen as a first coupling component a 1-(sulfoaryl)-3-methyl-5-pyrazolone and the first coupling operation is conducted in an acetic acid medium, and as a second coupling component a compound which is free from sulfonic acid groups and contains a —CH₂—CO— group rendering coupling possible and the second coupling operation is conducted in a medium rendered alkaline with an alkali carbonate, for example, sodium carbonate. As first coupling components for this purpose there come into consideration, for example: 1-(3'-sulfophenyl)- or 1-(4'-sulfophenyl)-3-methyl-5-pyrazolone, 1-(8'-sulfo-2'-naphthyl)-3-methyl-5-pyrazolone; and as second coupling components, for example, aceto-acetic acid anilide or 1-phenyl-3-methyl-5-pyrazolone.

Furthermore, especially valuable dyestuffs can be obtained by the process of the invention by choosing as the first coupling component an hydroxynaphthalene sulfonic acid capable of coupling in ortho-position with respect to the hydroxyl group, for example, 1:3-, 1:4-, 1:5, 2:4-, 2:6- or 2:7-hydroxynaphthalene sulfonic acid, and conducting the first coupling operation in a medium rendered alkaline with an alkali carbonate, and as the second coupling component an hydroxynaphthalene capable of coupling in ortho-position with respect to the hydroxyl group and free from sulfonic acid groups, for example, 2-hydroxynaphthalene, 2-amino-7-hydroxynaphthalene, 2-(β-hydroxyethylamino)-7-hydroxynaphthalene, and conducting the second coupling operation in a medium rendered alkaline with caustic alkali, for example, a medium containing sodium hydroxide.

Very valuable dyestuffs may also be obtained by the process of the invention by choosing as the first coupling component an aminohydroxynaphthalene-7-sulfonic acid, for example, 2-amino-5-hydroxynaphthalene-7-sulfonic acid, 2-amino-8-hydroxynaphthalene-6-sulfonic acid and substitution products thereof or 5:5'-dihydroxy-2:2'-dinaphthylamino-7:7'-disulfonic acid, and conducting the first coupling operation in a medium rendered alkaline with an alkali carbonate, and as the second coupling component a compound capable of coupling in ortho-position with respect to a hydroxyl group and free from sulfonic acid groups, for example, a pyrazolone such as 1-phenyl-3-methyl-5-pyrazolone or an hydroxynaphthalene such as 2-hydroxynaphthalene, 2:6-dihydroxynaphthalene, 2-hydroxy-6-methoxynaphthalene, 5:8-dichloro-1-hydroxynaphthalene, and conducting the second coupling operation in a medium rendered alkaline with caustic alkali.

The tetrazotization of the 3:3'-dihydroxy-4:4'-diamino-diphenyl used as starting material in the invention may be carried out in a manner in itself known by means of hydrochloric acid and sodium nitrite. As a rule it is of advantage first to neutralize the tetrazo-suspension and then isolate the tetrazo-compound, and to add it, for example, in the form of a filter cake, to the coupling mass which contains the first coupling component and is adjusted to the pH value chosen for the first coupling operation. The temperature of coupling is advantageously kept low, especially in the first coupling operation. In some cases it may be of advantage to isolate the intermediate compound after the first coupling, and to couple it in this condition with the solution containing the second coupling component. The working up of the coupling mass is carried out in a manner in itself known, for example, by salting out, if desired, after reducing the pH value by the addition of acid.

The dyestuffs obtainable by the invention are in part new and correspond to the general formula

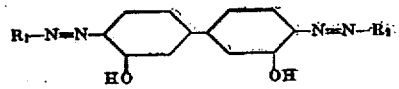

in which R₁ and R₂ represent the residues of two different coupling components. Among these products there are especially valuable those in which R₁ and R₂ together have the following meanings:

(a) R₁: The residue of a 1-(sulfoaryl)-3-methyl-5-pyrazolone, which is connected in 4-position to the azo-group, and R₂: The residue of a compound free from sulfonic acid groups and which residue is connected to the azo-group in a position vicinal to an enolisable or enolized keto group.

(b) R₁: The residue of an hydroxynaphthalene sulfonic acid which is connected to the azo-group in a position vicinal to the hydroxyl group, and R₂: The residue of an hydroxynaphthalene free from sulfonic acid group and which residue is connected to the azo-group in a position vicinal to the hydroxyl group.

(c) R₁: The residue of an amino-hydroxynaphthalene sulfonic acid which is bound to the azo-group, in one of the positions vicinal to the hydroxyl group, and R₂: The residue of coupling component which is free from sulfonic acid groups and contains a hydroxyl group, and which is bound to the azo-group in one of the positions vicinal to the azo-group.

The diazo-dyestuffs of the invention are suitable for dyeing a very wide variety of materials, especially cellulose fibers, such as cotton, and artificial silk and staple fibers of regenerated cellulose, but also for dyeing animal fibers, such as wool, silk and leather. When the dyestuff molecule contains metallizable groups, the dyestuffs may be converted in substance, in the dyebath or on the fiber into complex metal compounds, for example, copper, chromium, iron, nickel or cobalt compounds. The conversion into such metal compounds, which may contain a plurality of metals in the complex, is carried out in known manner in an acid, neutral or alkaline solution with or without the suitable additions, such as salts of inorganic or organic acids, or salts of acids capable of forming complexes such as tartaric acid or aminoacetic acid, in the presence or absence of a diluent or dispersing medium, such as pyridine or glycerine, and in an open vessel or under pressure. The production of the metal compounds in substance, especially copper compounds, is of special value in the case of metal-free dyestuffs which have insufficient affinity, and when the dyestuffs containing metal have an adequate solubility in the usual dyebaths. Furthermore, many complex metal compounds may be produced in substance, especially cobalt and/or nickel compounds, for the purpose of coloring masses or solutions thereof, such as nitrocellulose lacquers, artificial resins and spinning masses.

When the dyestuffs of the invention contain only a few groups imparting solubility and have an adequate or good affinity for cellulose fibers in the metal-free condition, they may with advantage be treated on the fiber or in the dyebath, or partially on the fiber and partially in the dyebath, with agents yielding metal by generally known methods. It is, however, of advantage to use the process of U. S. Patent No. 2,148,659, in which the material is first dyed and the treatment with an agent yielding metal is carried out in the same bath. As agents yielding metal for this purpose there are advantageously used those which are stable towards alkaline baths, such as complex copper tartrates and the like.

Certain asymmetrical disazo-dyestuffs obtained from tetrazotized 3:3'-dihydroxy-4:4'-diaminodiphenyl have been described in the literature (see for example, British Patent No. 102,881), but the first and second coupling operations are always carried out under practically the same conditions of pH value. This process has the disadvantage that only in very few cases it is possible to obtain a satisfactory result. With most combinations of diazo components and coupling components in this procedure non-homogeneous products are obtained, because in the first coupling operation a part of the tetrazo-compound reacts to form the symmetrical disazo dyestuff. On the other hand the process of the present invention leads to a considerable improvement in this respect in that it is practically always possible to obtain products in a homogeneous condition. Moreover, it is possible by the present invention to achieve combinations which could not be produced by the known process.

The following examples illustrate the invention, the parts being by weight:

Example 1

21.6 parts of 3:3'-dihydroxy-4:4'-diaminodiphenyl are tetrazotized in the usual manner, and the tetrazo-compound is neutralized and separated by filtration and introduced into a neutral solution of 25.4 parts of 1-(3'-sulfophenyl)-3-methyl-5-pyrazolone. The whole is stirred at room temperature until the tetrazo-compound can no longer be detected in the reaction mixture which contains the monoazo-dyestuff. A solution of 18.5 parts of acetoacetic acid anilide in 80 parts of water and 14 parts of caustic soda solution of 30 per cent. strength is then introduced, and stirring is continued for a few hours until coupling is complete. The dyestuff is worked up in the usual manner and dried. It dissolves in water with a brownish red coloration and in caustic soda solution with a blue-red coloration, and dyes cellulose fibers from a neutral or weakly alkaline bath brownish-red tints, which upon treatment with copper salts become brownish blue-red tints which are fast to light and washing.

Example 2

21.6 parts of 3:3'-dihydroxy-4:4'-diaminodiphenyl are tetrazotized in the usual manner, and the tetrazo compound is neutralized and separated by filtration, and introduced into a solution of 25.4 parts of 1-(4'-sulfophenyl)-3-methyl-5-pyrazolone rendered weakly acid with acetic acid. The whole is stirred at room temperature until the monoazo dyestuff is formed, a solution of 11 parts of 3-methyl-5-pyrazolone in 50 parts of water, 14 parts of caustic soda solution of 30 per cent. strength and 5 parts of calcined sodium carbonate are then added, and the whole is stirred until coupling is complete. The dyestuff is worked up in the usual manner and dried. It dissolves in water with a blue-red coloration, and dyes cellulose fibers from a neutral or weakly alkaline bath blue-red tints which upon treatment with copper salts become bluish Bordeaux tints which are fast to washing and light.

By using in this example 27 parts of 1-(8'-sulfo-2'-naphthyl)-3-methyl-5-pyrazolone, instead of the aforesaid quantity of 1-(4'-sulfophenyl)-3-methyl-5-pyrazolone, there is obtained a dyestuff which yields on cotton after-coppered dyeings of good fastness to washing and light and which have more bluish tints.

Example 3

The tetrazo-compound obtained from 21.6 parts of 3:3'-dihydroxy-4:4'-diaminodiphenyl produced as described in Example 1 is introduced into a neutral solution of 25.3 parts of 1-(4'-chloro-3'-carboxyphenyl)-3-methyl-5-pyrazolone, and the whole is stirred at room temperature until the monoazo-dyestuff is formed in the reaction mixture. A solution of 18.5 parts of 1-phenyl-3-methyl-5-pyrazolone in 80 parts of water and 14 parts of caustic soda solution of 30 per cent strength are then added, and the whole is stirred until coupling is complete. After separating and drying the dyestuff there is obtained a black-brown powder which dissolves in water with a brownish red coloration and in caustic soda solution with a blue-red coloration, and dyes cellulose fibers brownish blue-red tints, which upon treatment with copper salts become Bordeaux tints which are fast to washing and light.

Example 4

21.6 parts of 3:3'-dihydroxy-4:4'-diaminodiphenyl are converted into the tetrazo compound in the usual manner. The latter is isolated and introduced into a neutral solution of 25.4 parts of 1-(4'-sulfophenyl)-3-methyl-5-pyrazolone. When the monoazo-dyestuff is formed, a solution of 13.5 parts of barbituric acid in water and then 16 parts of a caustic soda solution of 30 per cent. strength are added, and the whole is stirred for a long time until coupling is complete. The dyestuff is worked up in the usual manner and dried. It dyes cellulose fibers brown-red tints, which upon treatment with copper salts become Bordeaux tints which are fast to light and washing.

Example 5

21.6 parts of 3:3'-dihydroxy-4:4'-diaminodiphenyl are tetrazotized in the usual manner, and the tetrazo-compound is neutralized and separated by filtration, and introduced into a solution of 22.4 parts of 2-hydroxy-naphthalene-6-sulfonic acid in 100 parts of water and 30 parts of potassium carbonate. The whole is stirred at 10–15° C. until the tetrazo-compound can no longer be detected in the reaction mixture containing the monoazo-dyestuff. A solution of 16 parts of 2-hydroxy-naphthalene in 60 parts of water and 6 parts of caustic alkali are added, and the coupling is completed by slowly raising the temperature to 30° C. in the course of 24–30 hours. The dyestuff is then worked up and dried in the usual manner. It dissolves in water with a violet coloration and in caustic soda solution with a blue coloration, and dyes cellulose fibers violet tints which upon treatment with copper salts become bluish violet tints which are fast to washing and light.

By using, instead of 2-hydroxynaphthalene-6-sulfonic acid, 2-hydroxynaphthalene-4- or 7-sulfonic acid or 1-hydroxynaphthalene-4- or 5-sulfonic acid there are obtained somewhat more bluish tints. A similar dyestuff can also be obtained by using in the second coupling operation, instead of 2-hydroxynaphthalene, 2-hydroxy-7-aminonaphthalene or 2-hydroxy-7-hydroxyethylaminonaphthalene, for example.

The appended claims are directed to the subject matter of the first paragraph of this example.

Example 6

21.6 parts of 3:3'-dihydroxy-4:4'-diaminodiphenyl are tetrazotized in the usual manner, the tetrazo compound is neutralized and separated by filtration, and introduced into a solution of 23.9 parts of 2-amino-5-hydroxynaphthalene-7-sulfonic acid in 100 parts of water and 11 parts of calcined sodium carbonate. The whole is stirred at room temperature until the formation of the monoazo-dyestuff is complete. The intermediate compound is isolated by filtration, and added to a solution of 16 parts of 2-hydroxynaphthalene in 60 parts of water and 7 parts of caustic potash. The whole is stirred while gradually increasing the temperature to complete the coupling, and the dyestuff is worked up in the usual manner. A bluish black powder is obtained which dissolves in water with a reddish blue coloration and in caustic soda solution with a greenish blue coloration. By dyeing from a neutral or weakly alkaline bath there are obtained on cellulose fibers blue tints which upon treatment with copper salts become clear reddish blue tints which are fast to washing and light.

By using 2-amino-8-hydroxynaphthalene-6-sulfonic acid, instead of 2-amino-5-hydroxynaphthalene-7-sulfonic acid, slightly dull blue tints are obtained, and clear greenish blue tints are obtained by using 5:5'-dihydroxy-2:2'-dinaphthylamino-7:7'-disulfonic acid.

By using in this example, instead of 2-hydroxynaphthalene, 2:6-dihydroxynaphthalene or 2-hydroxy-6-methoxynaphthalene or 5:8-dichloro-1-hydroxynaphthalene and conducting the second coupling operation, for example, with the addition of a little pyridine towards the end, a similar dyestuff is obtained. By using 1-(8'-sulfo-2'-naphthyl)-3-methyl-5-pyrazolone, instead of 2-hydroxynaphthalene, there is obtained a dyestuff which dyes cotton by the single bath or 2-bath after coppering process violet tints of good fastness to light and washing.

Example 7

The tetrazo-compound obtained from 21.6 parts of 3:3'-dihydroxy-4:4'-diaminodiphenyl is introduced into a solution of 46.1 parts of 5:5'-dihydroxy-2:2'-dinaphthylamino-7:7'-disulfonic acid in 200 parts of water and 15 parts of potassium carbonate, and the whole is stirred until the formation of monoazo-dyestuff ceases. A solution of 18.5 parts of 1-phenyl-3-methyl-5-pyrazolone in 50 parts of water and 6 parts of caustic potash is then added, and the coupling is brought to completion at 15–25° C. The dyestuff is worked up and dried in the usual manner. It dyes cellulose fibers from neutral or weakly alkaline baths violet tints which upon treatment with copper salts become blue-violet tints which are fast to washing and light.

Example 8

21.6 parts of 3:3'-dihydroxy-4:4'-diaminodiphenyl are tetrazotized in the usual manner, and the tetrazo compound is neutralized and separated by filtration and introduced into a solution of 22.4 parts of 2-hydroxynaphthalene-7-sulfonic acid in 300 parts of potassium carbonate solution of 10 per cent. strength. The whole is stirred at 8–10° C. until the tetrazo compound can no longer be detected in the reaction mixture. A solution of 23.9 parts of 2-amino-5-hydroxynaphthalene-7-sulfonic acid in 100 parts of water, 30 parts of caustic potash solution of 40 per cent. strength and 30 parts of pyridine are added, and the whole is stirred while gradually raising the temperature in order to complete the coupling. The dyestuff is worked up in the usual manner. A dark powder is obtained which dissolves in water with a blue coloration. There are obtained on cellulose fibers from neutral or weakly alkaline baths blue tints, which upon treatment with copper salts become fast to light and washing.

By using 2-phenylamino- or 2-hydroxyethylamino-5-hydroxynaphthalene-7-sulfonic acid, instead of 2-amino-5-hydroxynaphthalene-7-sulfonic acid, there are obtained more greenish tints. By using 1-hydroxynaphthalene-4-sulfonic acid, instead of 2-hydroxynaphthalene-7-sulfonic acid, a similar dyestuff is obtained and with 1-hydroxynaphthalene-5-sulfonic acid more reddish slightly dull blue tints and with 1-hydroxynaphthalene-3-sulfonic acid somewhat more greenish-blue tints are obtained.

Example 9

The tetrazo compound obtained from 21.6 parts of 3.3'-dihydroxy-4:4'-diaminodiphenyl is introduced at 5–6° C. into a solution of 9.8 parts of 3-methyl-5-pyrazoline in 100 parts of methanol and 40 parts of an aqueous solution of sodium acetate of 30 per cent. strength. The whole is stirred for 8–12 hours at 5–10° C. until the tetrazo compound can no longer be detected. 24 parts of 2:8-dihydroxynaphthalene-6-sulfonic acid are then added, and 45 parts of an aqueous potassium hydroxide solution of 50 per cent. strength are added dropwise in the course of 1 hour at 8–10° C. The whole is stirred for 24 hours at 10–20° C., and the resulting disazo-dyestuff is then precipitated by dilution with water and neutralization. It is separated by filtration and dried under reduced pressure. A dark brown powder is obtained which dissolves in sodium carbonate solution with a brown coloration and dyes cellulose fibers by the single bath or 2-bath coppering process violet tints which are fast to washing and light.

Example 10

100 parts of cotton are entered at 50° C. into a dyebath consisting of 4000 parts of water containing 2 parts of sodium carbonate and 0.5 part of the dyestuff obtained as described in the first paragraph of Example 6. The temperature is slowly raised to the boil, 30 parts of Glauber salt are added, and dyeing is carried on for ¾ hour at 95–100° C. The whole is then allowed to cool to about 70° C., 0.5 part of complex copper-sodium tartrate of approximately neutral reaction is added, coppering is carried on for ½ hour at about 80° C., and the goods are thoroughly rinsed with cold water. If desired, the blue dyeing so obtained may be soaped.

What we claim is:

1. The disazo-dyestuff of the formula

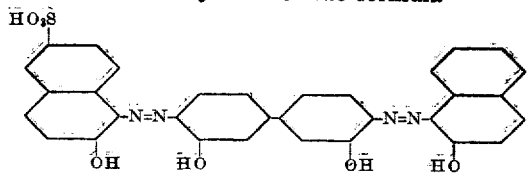

2. Process for the manufacture of an asymmetrical disazo-dyestuff, which comprises coupling tetrazotized 3:3'-dihydroxy-4:4'-diaminodiphenyl in the first place in a medium rendered alkaline with an alkali carbonate with 2-hydroxynaphthalene-6-sulfonic acid and in the second place in a medium rendered alkaline with a caustic alkali with 2-hydroxynaphthalene.

HANS MAYER.
WILLY WIDMER.

REFERENCES CITED

The following references are of record in the file of this patent:

UNITED STATES PATENTS

| Number | Name | Date |
|---|---|---|
| 1,210,751 | Anderwert et al. | Jan. 2, 1917 |
| 1,292,385 | Anderwert | Jan. 21, 1919 |
| 1,457,235 | Stusser | May 29, 1923 |
| 1,889,732 | Stusser et al. | Nov. 29, 1932 |
| 2,193,438 | Taube et al. | Mar. 12, 1940 |
| 2,241,796 | Taube et al. | May 13, 1941 |
| 2,384,419 | Fleischhauer | Sept. 4, 1945 |
| 2,404,198 | Straub et al. | July 16, 1946 |
| 2,424,006 | Straub et al. | July 15, 1947 |
| 2,426,977 | Straub et al. | Sept. 9, 1947 |
| 2,427,537 | Straub et al. | Sept. 16, 1047 |

FOREIGN PATENTS

| Number | Country | Date |
|---|---|---|
| 102,881 | Great Britain | Jan. 4, 1917 |
| 410,192 | Great Britain | May 14, 1934 |
| 232,510 | Switzerland | Aug. 16, 1944 |

Certificate of Correction

Patent No. 2,476,259                                                     July 12, 1949

HANS MAYER ET AL.

It is hereby certified that errors appear in the printed specification of the above numbered patent requiring correction as follows:

Column 2, lines 9 and 10, for the word "pyrazolone" read *pyrazolones*; lines 11 and 12, for "pyrazolone;" read *pyrazolones,*; line 31, for "2-amino-" read , *2-amino-*; column 8, line 26, for "pyrazoline" read *pyrazolone*;

and that the said Letters Patent should be read with these corrections therein that the same may conform to the record of the case in the Patent Office.

Signed and sealed this 3rd day of January, A. D. 1950.

[SEAL]

THOMAS F. MURPHY,
*Assistant Commissioner of Patents.*